(12) United States Patent
Wang et al.

(10) Patent No.: US 12,282,746 B2
(45) Date of Patent: Apr. 22, 2025

(54) DISPLAY METHOD, ELECTRONIC DEVICE, AND STORAGE MEDIUM

(71) Applicant: Beijing Baidu Netcom Science Technology Co., Ltd., Beijing (CN)

(72) Inventors: Haifeng Wang, Beijing (CN); Zhanyi Liu, Beijing (CN); Zhongjun He, Beijing (CN); Hua Wu, Beijing (CN); Zhi Li, Beijing (CN); Xing Wan, Beijing (CN); Jingxuan Zhao, Beijing (CN); Ruiqing Zhang, Beijing (CN); Chuanqiang Zhang, Beijing (CN); Fengtao Huang, Beijing (CN); Hanbing Song, Beijing (CN); Wei Di, Beijing (CN); Shuangshuang Cui, Beijing (CN); Yongzheng Xin, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 206 days.

(21) Appl. No.: 17/820,765

(22) Filed: Aug. 18, 2022

(65) Prior Publication Data
US 2022/0391602 A1 Dec. 8, 2022

(30) Foreign Application Priority Data
Aug. 18, 2021 (CN) .......................... 202110951952.1

(51) Int. Cl.
*G06F 40/58* (2020.01)
(52) U.S. Cl.
CPC ................................. *G06F 40/58* (2020.01)

(58) Field of Classification Search
CPC ...... G06F 40/58; G06F 40/103; G06F 40/216; G06F 40/284; G06F 40/30; G06F 40/169; G06F 40/279; G06F 704/03; G06V 30/10
See application file for complete search history.

(56) References Cited

U.S. PATENT DOCUMENTS

| | | | | |
|---|---|---|---|---|
| 6,346,952 | B1 * | 2/2002 | Shtivelman | G06F 16/345 707/999.005 |
| 6,519,631 | B1 * | 2/2003 | Rosenschein | G06Q 30/0253 709/219 |

(Continued)

FOREIGN PATENT DOCUMENTS

| | | |
|---|---|---|
| CN | 102098580 | 6/2011 |
| CN | 105528341 | 4/2016 |

(Continued)

OTHER PUBLICATIONS

Office Action issued in Japanese Patent Application No. 2022-101792, Aug. 1, 2023, 8 pages w/translation.

(Continued)

*Primary Examiner* — Fariba Sirjani
(74) *Attorney, Agent, or Firm* — HSML P.C.

(57) ABSTRACT

A display method, an electronic device, and a storage medium, which relate to a field of natural language processing and a field of display. The display method includes: acquiring a content to be displayed; extracting a target term from the content using a term extraction rule; acquiring an annotation information for at least one target term, responsive to an extraction of the at least one target term; and displaying the annotation information for the at least one target term and the content.

11 Claims, 9 Drawing Sheets

(56) References Cited

U.S. PATENT DOCUMENTS

| | | | | |
|---|---|---|---|---|
| 7,236,923 B1* | 6/2007 | Gupta | ................... | G06F 40/284 |
| | | | | 704/7 |
| 7,496,230 B2* | 2/2009 | Chen | ....................... | G06F 9/543 |
| | | | | 715/265 |
| 11,003,667 B1* | 5/2021 | Bakir | ................ | G06F 16/24575 |
| 11,514,913 B2* | 11/2022 | Huitric | ................... | G10L 15/26 |
| 2001/0029455 A1* | 10/2001 | Chin | ....................... | G06F 40/58 |
| | | | | 704/277 |
| 2003/0139921 A1* | 7/2003 | Byrd | .................... | G06F 40/289 |
| | | | | 704/10 |
| 2003/0187632 A1* | 10/2003 | Menich | ................. | G06Q 10/10 |
| | | | | 704/1 |
| 2004/0248068 A1* | 12/2004 | Davidovich | ........... | G09B 19/06 |
| | | | | 434/156 |
| 2009/0081630 A1* | 3/2009 | Jeffers | ....................... | G09B 5/06 |
| | | | | 434/362 |
| 2011/0276901 A1* | 11/2011 | Zambetti | ............. | H04L 12/1827 |
| | | | | 715/753 |
| 2011/0313754 A1* | 12/2011 | Bastide | ................ | G06Q 10/107 |
| | | | | 704/2 |
| 2014/0289604 A1* | 9/2014 | Cheung | ................... | G06F 40/58 |
| | | | | 715/261 |
| 2017/0154030 A1* | 6/2017 | Moorjani | ............... | H04M 3/567 |
| 2019/0043020 A1* | 2/2019 | Donofrio | ................ | G06Q 10/1095 |
| 2020/0177838 A1* | 6/2020 | Yoshida | ................. | H04N 7/147 |
| 2021/0374362 A1* | 12/2021 | Shin | ........................ | G06F 40/58 |
| 2022/0303320 A1* | 9/2022 | Zhang | ................ | H04L 65/1089 |
| 2022/0391602 A1* | 12/2022 | Wang | ....................... | G06F 40/58 |
| 2023/0237837 A1* | 7/2023 | Shepherd | ............. | G06V 40/166 |
| | | | | 382/104 |
| 2023/0260519 A1* | 8/2023 | Medalion | ............... | G06V 20/46 |
| | | | | 704/232 |

FOREIGN PATENT DOCUMENTS

| | | |
|---|---|---|
| CN | 111541904 | 8/2020 |
| CN | 112784051 | 5/2021 |
| JP | 2003-085173 | 3/2003 |
| JP | 2010-113558 | 5/2010 |
| JP | 2017-097488 | 6/2017 |

OTHER PUBLICATIONS

First Chinese Office Action, issued in the corresponding Chinese patent application No. 202110951952.1, dated Jan. 19, 2022, 16 pages.

Second Chinese Office Action, issued in the corresponding Chinese patent application No. 202110951952.1, dated May 7, 2022, 14 pages.

Rejection Office Action, issued in the corresponding Chinese patent application No. 202110951952.1, dated Jul. 25, 2022, 5 pages.

* cited by examiner

DISPLAY METHOD, ELECTRONIC DEVICE, AND STORAGE MEDIUM

CROSS REFERENCE TO RELATED APPLICATION(S)

This application claims priority to Chinese Patent Application No. 202110951952.1, filed on Aug. 18, 2021, the entire content of which is incorporated herein in its entirety by reference.

TECHNICAL FIELD

The present disclosure relates to a field of natural language processing and a field of display, in particular to a term annotation technology, and more specifically, to a display method, an electronic device, and a storage medium.

BACKGROUND

A natural language processing technology, as a massive rock in a field of artificial intelligence, has received more and more attention. However, due to an existence of various specialized industry terms in different fields, it is difficult for an existing natural language processing technology to accurately process these terms in a targeted manner.

Especially for a simultaneous interpretation technology, an existing simultaneous interpretation device has many errors in speech recognition and translation of industry terms, and it is difficult to meet requires of different professional fields. In addition, some terms may be unfamiliar to a user, which may affect the understanding of content.

SUMMARY

The present disclosure provides a display method, an electronic device, and a storage medium.

According to an aspect of the present disclosure, a display method is provided, including: acquiring a content to be displayed; extracting a target term from the content using a term extraction rule; acquiring an annotation information for at least one target term, responsive to an extraction of the at least one target term; and displaying the annotation information for the at least one target term and the content.

According to an aspect of the present disclosure, an electronic device is provided, including: at least one processor; and a memory communicatively connected to the at least one processor, wherein the memory stores instructions executable by the at least one processor, and the instructions, when executed by the at least one processor, cause the at least one processor to implement the method described in embodiments of the present disclosure.

According to an aspect of the present disclosure, a non-transitory computer-readable storage medium having computer instructions therein is provided, wherein the computer instructions are configured to cause a computer system to implement the method described in embodiments of the present disclosure.

It should be understood that content described in this section is not intended to identify key or important features in the embodiments of the present disclosure, nor is it intended to limit the scope of the present disclosure. Other features of the present disclosure will be easily understood through the following description.

BRIEF DESCRIPTION OF THE DRAWINGS

The accompanying drawings are used for better understanding of the solution and do not constitute a limitation to the present disclosure, wherein.

DETAILED DESCRIPTION OF EMBODIMENTS

Exemplary embodiments of the present disclosure will be described below with reference to the accompanying drawings, which include various details of the embodiments of the present disclosure to facilitate understanding and should be considered as merely exemplary. Therefore, those of ordinary skilled in the art should realize that various changes and modifications may be made to the embodiments described herein without departing from the scope and spirit of the present disclosure. Likewise, for clarity and conciseness, descriptions of well-known functions and structures are omitted in the following description.

Figure 1:
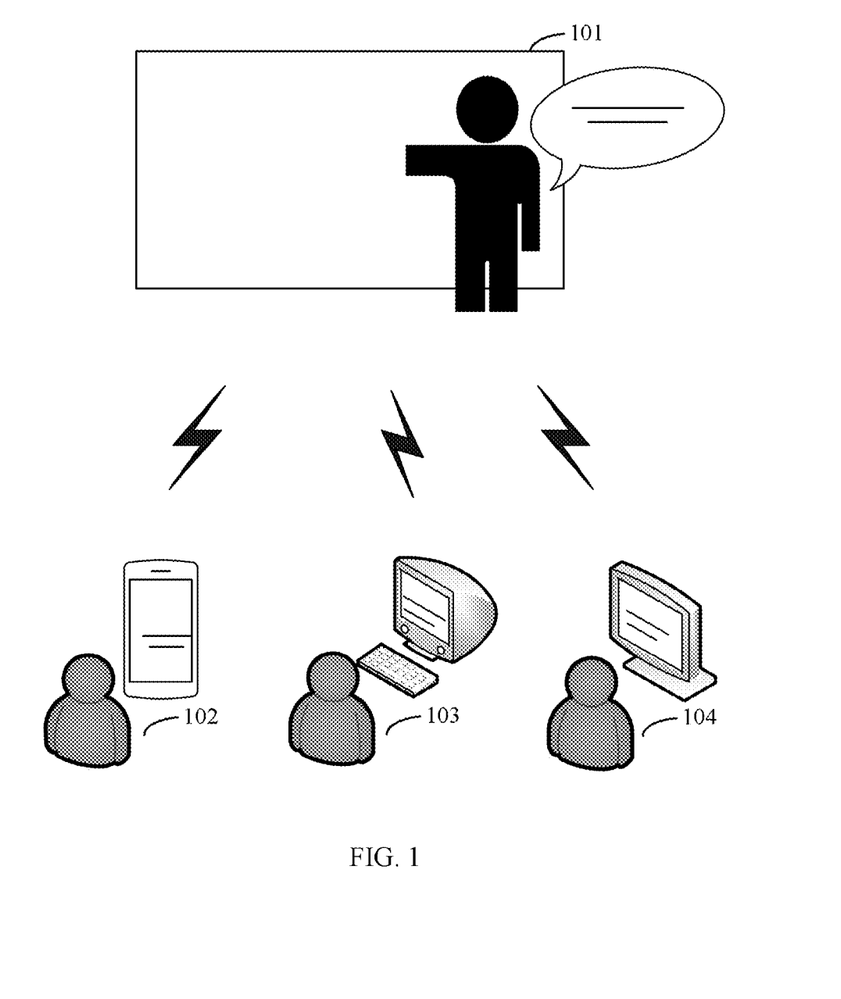
FIG. 1 shows an example of an application scenario of a display method and a display apparatus according to exemplary embodiments of the present disclosure.

A display method and a display apparatus according to exemplary embodiments of the present disclosure may be applied in various scenarios of natural language processing, for example, in scenarios such as subtitle translation, machine simultaneous interpretation, content summary extraction, and so on. As an application example, FIG. 1 shows an application of the display method and the display apparatus according to exemplary embodiments of the present disclosure to the scenario of machine simultaneous interpretation. FIG. 1 will be described in detail below.

The machine simultaneous interpretation may be used to automatically recognize a speech content of a speaker, convert the speech content into a text and translate the speech content into a target language, by using a speech recognition technology and a machine translation technology. With a development of globalization and frequent international exchanges, a demand for the machine simultaneous interpretation is increasing, and there is a broad space for a development of the machine simultaneous interpretation As shown in FIG. 1, a plurality of users 101 to 104 may be in the scenario of natural language processing such as the machine simultaneous interpretation, one of the plurality of users 101 to 104 (e.g., the user 101 as a speaker) makes a speech, and other users 102, 103 and 104 view a translation result of the machine simultaneous interpretation through their respective devices (e.g., electronic devices such as mobile phones, computers, monitors, etc.). When the user 101 makes a speech, the speech of the user 101 may be acquired, then a speech recognition is performed on the speech, and it may be determined, by using a speech processing method according to exemplary embodiments of the present disclosure, whether a corresponding speech recognition result contains an industry term or not. If an industry term is contained, the corresponding content may be processed using the speech processing method according to exemplary embodiments of the present disclosure.

It should be clear to those skilled in the art that the present disclosure is not limited to this scenario, but may be applied to various scenarios in which the natural language processing is required.

Figure 2:
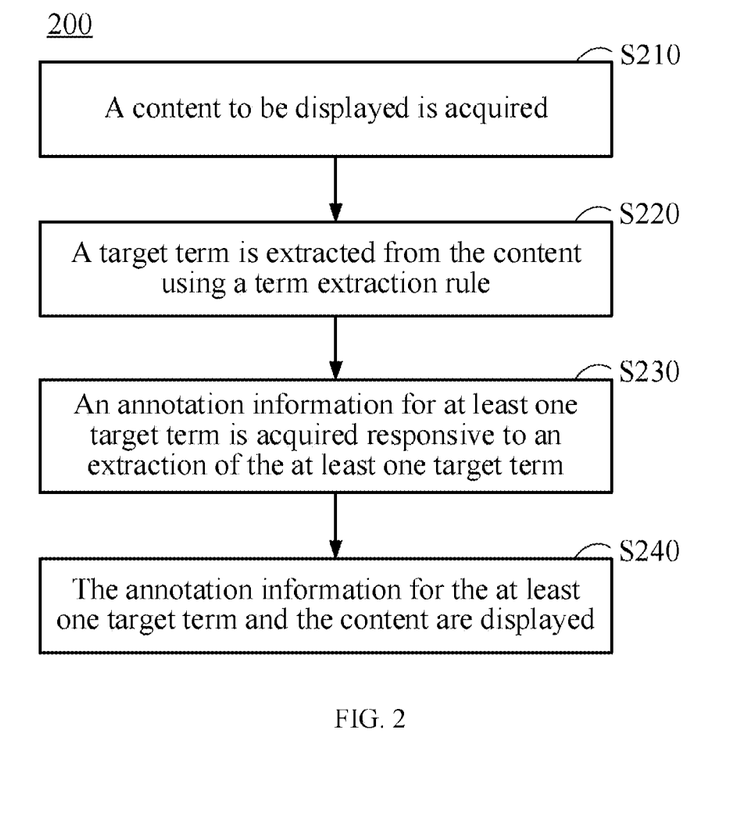
FIG. 2 shows a flowchart of a display method according to exemplary embodiments of the present disclosure.

FIG. 2 shows a flowchart of a display method according to exemplary embodiments of the present disclosure.

As shown in FIG. 2, a display method 200 according to exemplary embodiments of the present disclosure may include steps S210 to S240.

In step S210, a content to be displayed is acquired. The content to be displayed may include at least one selected from: a speech, a text, or an image.

For example, for a case that the content to be displayed is a content including a speech, the speech of the speaker may be acquired when the speaker is speaking, and the speech may be processed to obtain a speech processing result. For example, the acquired speech may be recognized using the speech recognition technology, and processed using a semantic analysis technology, a translation technology, or the like, so as to obtain the speech processing result. In an example, the acquired speech may be recognized by using various trained speech recognition models, and may be substantially recognized in real time. For example, the speech recognition may be performed based on a network model such as a Bidirectional Encoder Representations from Transformers (BERT) network, a TRANSFORMER network, or the like.

In an example, for a case that the content to be displayed is a content including an image, the image may be recognized using a character recognition technology such as Optical Character Recognition (OCR), so as to obtain an image recognition result.

In an example, for a case that the content to be displayed is a content including a text, for example, in an application scenario of subtitle translation or text summary extraction, the content to be displayed may be a text containing a large amount of words, and the natural language processing technology may be used to recognize characters contained in the text for a subsequent extraction of a target term.

In step S220, a target term is extracted from the content using a term extraction rule. The term extraction rule may be based on at least one selected from: a trained tagging model, a word frequency analysis, a text style difference, or the like. For example, the trained tagging model may be a tagging model adopting, for example, a BERT architecture, which may achieve a term extraction model by training on a term tagging dataset. The architecture of the tagging model is not limited to the BERT network, and various types of training models capable of term extraction may be used. As an example, the word frequency analysis-based term extraction rule may be based on a fact that terms tend to be words that appear less frequently in general fields and more frequently in specialized fields. Therefore, by counting a word probability, a word that meets the above-mentioned condition may be determined as a term. In a case that the content to be displayed includes a text, the term extraction rule may also be a rule based on the text style difference. In an example, a keyword may be extracted according to a special style in the text, and the special style may include, for example, bold, italic, short text appearing independently, or the like. The above-mentioned term extraction rules may be used alone or in any combination.

In step S230, an annotation information for at least one target term is acquired responsive to an extraction of the at least one target term. The annotation information may include at least one selected from: an explanation and a description of the target term, a translation result corresponding to the target term, and/or other information. In an example, the annotation information for the at least one target term may be acquired by querying a local database or accessing the Internet. The local database may have accumulated industry terms in various fields and corresponding annotation information for query. In addition, acquiring the annotation information for the at least one target term via the Internet may include providing access to services such as various encyclopedia-type APPs via the Internet, so as to acquire the annotation information for the at least one target term.

In step S240, the annotation information for the at least one target term and the content are displayed. That is, both the content and the annotation information for the target term contained in the content may be displayed. In an example, the annotation information for the target term may be displayed while displaying the content. In addition, the target term corresponding to the annotation information contained in the content may be displayed to have a visual effect different from that of other parts, other than the target term, of the content, so as to emphasize the target term.

Exemplary embodiments of the present disclosure provide a display method that may provide an intelligent natural language processing service with little or no human intervention, and may further provide a convenient term customization service for the user, which may help the user to enhance the understanding of the content, by automatically performing the term extraction, acquiring the annotation information for the term, and displaying the content and the annotation information for the term.

Figure 3:
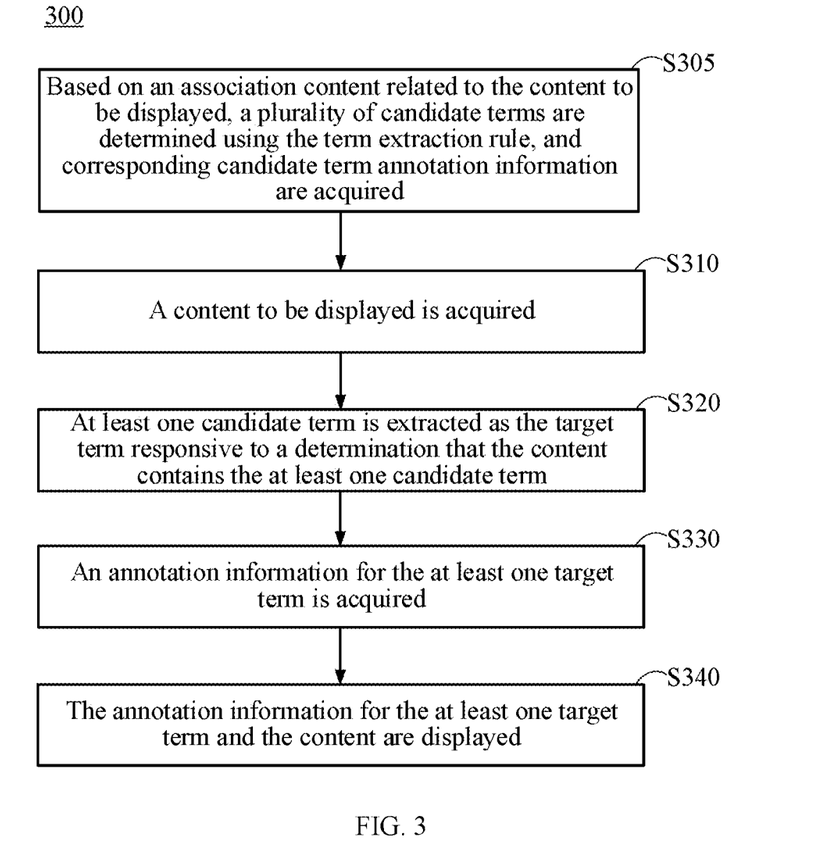
FIG. 3 shows a flowchart of a display method according to exemplary embodiments of the present disclosure.

In order to further improve an efficiency of the term extraction and an accuracy of the annotation information, the display method according to exemplary embodiments of the present disclosure may additionally include predetermining a plurality of candidate terms and candidate term annotation information corresponding to the plurality of candidate terms, and the candidate terms and the candidate term annotation information may be used in a determination of the target term. FIG. 3 shows a flowchart of the display method according to exemplary embodiments of the present disclosure.

As shown in FIG. 3, a display method 300 may include steps S305 to S340.

In step S305, based on an association content of the content to be displayed, a plurality of candidate terms are determined using the term extraction rule and corresponding candidate term annotation information are acquired. The association content refers to a content related to the content to be displayed. In a conference scenario, the association content may include a written speech of the speaker, a screen picture of the speaker, a conference-related database, or the like. In the subtitle translation scenario, the association content may include a subtitle of an association movie, etc. In an example, a database having candidate terms and candidate term annotation information therein may be created and stored based on the association content, so as to quickly and accurately extract a term during the term recognition and acquire annotation information for the term.

In step S310, the content to be displayed may be acquired. Step S310 is similar to step S210 shown in FIG. 2, which will not be repeated here.

An analysis may then be performed on the content to extract the target term contained in the content. The plurality of candidate terms and the candidate term annotation information have been determined in step S305, therefore, in step S320, it may be determined whether the content contains at least one candidate term or not, and responsive to a determination that the content contains the candidate term, the contained candidate term may be extracted as the target term.

In step S330, the stored candidate term annotation information corresponding to the candidate term may be acquired and determined as the annotation information for the target term.

In step S340, the annotation information for the target term contained in the content may be displayed while displaying the content. Step S340 is similar to step S240 shown in FIG. 2, which will not be repeated here.

Several examples for determining the candidate terms and the candidate term annotation information will be exemplarily described below with reference to FIG. 4A and FIG. 4B.

Figure 4A:
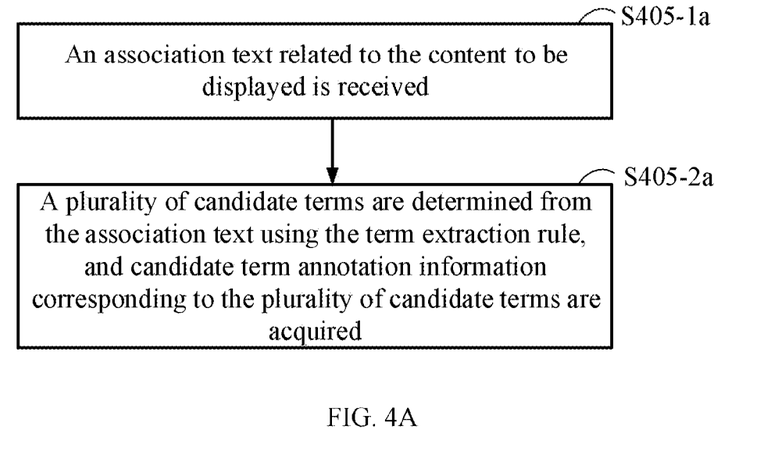
FIG. 4A shows a flowchart of an operation for determining candidate terms and candidate term annotation information according to exemplary embodiments of the present disclosure.

FIG. 4A shows a flowchart of an operation for determining candidate terms and candidate term annotation information according to exemplary embodiments of the present disclosure. As shown in FIG. 4A, such operation may include step S405-1a and step S405-2a.

In step S405-1a, an association text related to the content to be displayed is received. In embodiments, the association text may include, but not be limited to, a written speech of the speaker, a reference material of the speaker, an association subtitle, or the like.

In step S405-2a, a plurality of candidate terms are determined from the association text by using the term extraction rule, and candidate term annotation information corresponding to the plurality of candidate terms are acquired. For example, by using the above-mentioned term extraction rule, an initial candidate term set may be extracted from a PPT document or a related document which is used as a written speech; and a filtering may be performed on the initial candidate term set to perform a de-duplication on the initial candidate term set, so as to obtain a final candidate term set.

Figure 4B:
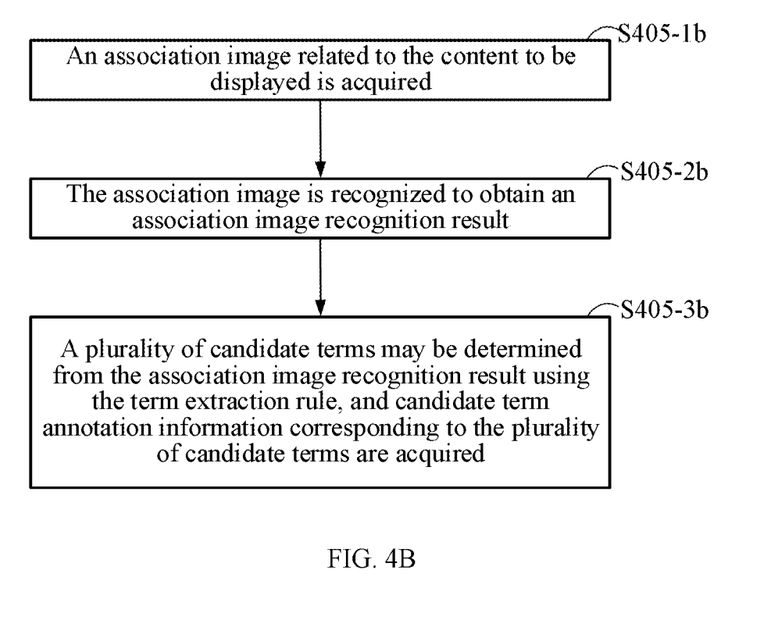
FIG. 4B shows a flowchart of an operation for determining candidate terms and candidate term annotation information according to exemplary embodiments of the present disclosure.

FIG. 4B shows a flowchart of an operation for determining candidate terms and candidate term annotation information according to exemplary embodiments of the present disclosure. As shown in FIG. 4B, such operation may include steps S405-1b to S405-3b.

In step 405-1b, an association image related to the content to be displayed is acquired. For example, the association image may be a screen picture when the speaker is speaking.

In step 405-2b, the association image is recognized to obtain an association image recognition result. For example, an information contained in the screen picture may be recognized by using various recognition methods. For example, a text information contained in the association image may be recognized by using the optical character recognition method.

In step 405-3b, a plurality of candidate terms may be determined from the association image recognition result by using the above-mentioned term extraction rule, and corresponding candidate term annotation information may be acquired.

In an example, a general term database or industry-specific term database may be added, and a term contained in a corresponding database may be determined as a candidate term for using. For example, in a scenario of a simultaneous interpretation in a conference, the term database may be a database provided by a conference organizer, so that a term may be extracted and an annotation information for the term may be acquired more quickly and accurately.

Several examples of the operation for determining the candidate terms are described above. It should be clear to those skilled in the art that a concept of the present disclosure may include other examples, and different examples may be combined in any manner without departing from the concept of the present disclosure.

The candidate terms determined in the above methods may be used to the extraction of the target term. Alternatively, after the above process of determining the candidate terms, top K candidate terms may be selected as the final candidate term set through a voting mechanism, and used to the extraction of the target term. As described above, after an acquisition of the content to be displayed, it may be determined whether the content contains at least one of the plurality of candidate terms, and responsive to a determination that the content contains at least one candidate term, the at least one candidate term and corresponding candidate term annotation information thereof may be extracted as the target term and the annotation information for the target term, respectively. Therefore, by predetermining the plurality of candidate terms and the corresponding candidate term annotation information, the extraction of the target term may be accelerated, and the accuracy of the annotation information may be improved, which may help the user to understand the content.

In the above-mentioned examples of the operation for determining the candidate terms and the corresponding candidate term annotation information, the method according to embodiments of the present disclosure may further include an operation for reviewing the determined plurality of candidate terms and corresponding candidate term annotation information. For example, the determined plurality of candidate terms and/or the corresponding candidate term annotation information may be reviewed manually by a reviewer. In addition to the manual review, a suitable review algorithm may be combined additionally or may be used independently to review the candidate terms and/or the related annotation information. As a result, an intervention on the term extraction and the term annotation may be achieved with a low human effort, so as to provide a more professional term annotation.

Figure 5A:
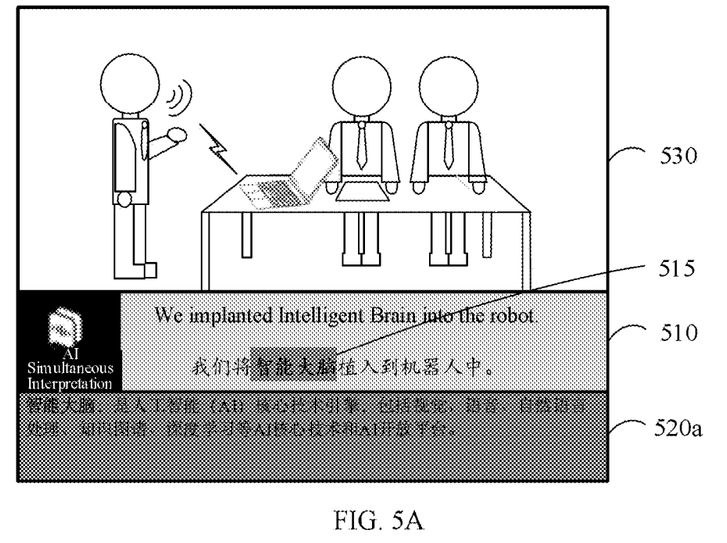
FIG. 5A shows an interface for displaying a content and an annotation information for a term according to exemplary embodiments of the present disclosure.
Figure 5B:
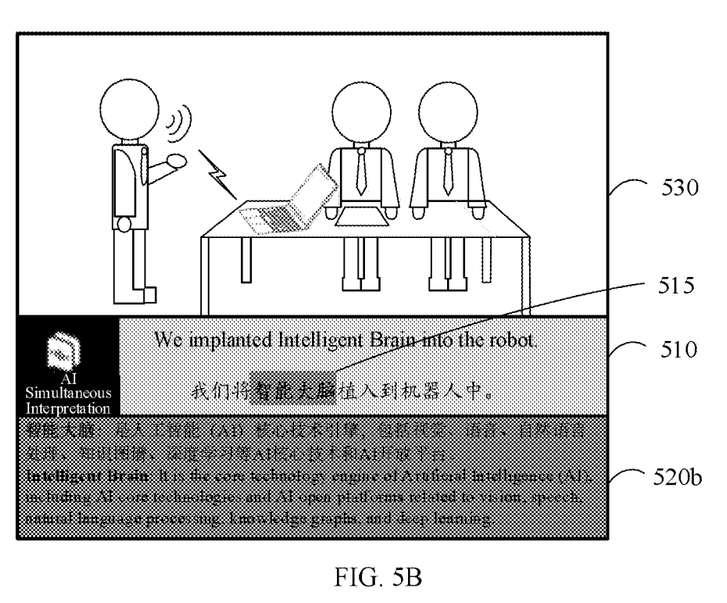
FIG. 5B shows an interface for displaying a content and an annotation information for a term according to exemplary embodiments of the present disclosure.

FIG. 5A and FIG. 5B each shows an interface for displaying a content and an annotation information for a term according to exemplary embodiments of the present disclosure.

FIG. 5A and FIG. 5B each shows a display picture of a device of a user in which the display method according to exemplary embodiments of the present disclosure is used. The display method according to exemplary embodiments of the present disclosure may be implemented to display both the annotation information for at least one target term and a content to be displayed. As shown in FIG. 5A and FIG. 5B, the display picture may include a first region 510 for displaying the content to be displayed, a second region 520a or 520*b* for displaying the annotation information for the term, and a third region 530 for displaying other content. Specifically, FIG. 5A shows an example picture in which the annotation information for the target term displayed in the second region 520*a* is only in a target language, and FIG. 5B shows an example picture in which the annotation information for the target term displayed in the second region 520*b* is in both the target language and a source language.

In the scenario of simultaneous interpretation, a speech content of a speaker and a translation result corresponding to the speech content may be displayed in the first region 510, an annotation information for a target term contained in the speech content may be displayed in the second region 520*a*/520*b*, and a picture of a conference site may be displayed in the third region 530. For example, when the speaker makes a speech "We implanted Intelligent Brain into the robot", the display method according to exemplary embodiments of the present disclosure may be implemented to: acquire the speech; and recognize, by using the speech recognition technology and the speech processing technology, that the source language of the speech is English, and that a speech content of the speech is "We implanted Intelligent Brain into the robot". By viewing system settings, it may be obtained that the target language is, for example, Chinese, and in this case, a translation result of the speech content, "我们將智能人 脑植入到机器人中", may be displayed in the first region 510 in Chinese, as shown in FIG. 5A and FIG. 5B.

Next, by analyzing the content using the term recognition rule, or by matching with the candidate term set, it may be determined that "智能大脑" is a term 515 contained in this sentence, and then, an annotation information for "智能大脑" may be acquired. Accordingly, in this example, the annotation information for the term 515, "智能大脑" may be displayed in the second region 520*a* in Chinese, as shown in FIG. 5A. Alternatively, as shown in FIG. 5B, the annotation information for the term 515 may be displayed in the second region 520*b* in both Chinese and English so that the related content may be better understood by a user who uses the source language and a user who uses the target language.

It should be noted that in the first region for displaying the content, a display visual effect of the target term may be set to be different from a display visual effect of other parts in the content. For example, as shown in FIG. 5A and FIG. 5B, the target term may be highlighted to remind the user that the term belongs to an industry term and is provided with an annotation information for viewing, so as to help the user to quickly understand the related speech content in combination with the annotation information. In addition to highlighting, other styles, such as italic, bold, underline, or the like, may also be used to emphasize the target term.

Therefore, the display method according to exemplary embodiments of the present disclosure may be implemented to perform a term intervention and provide the annotation information for the term while displaying the content, so as to help the user to better understand the related content.

Figure 6:
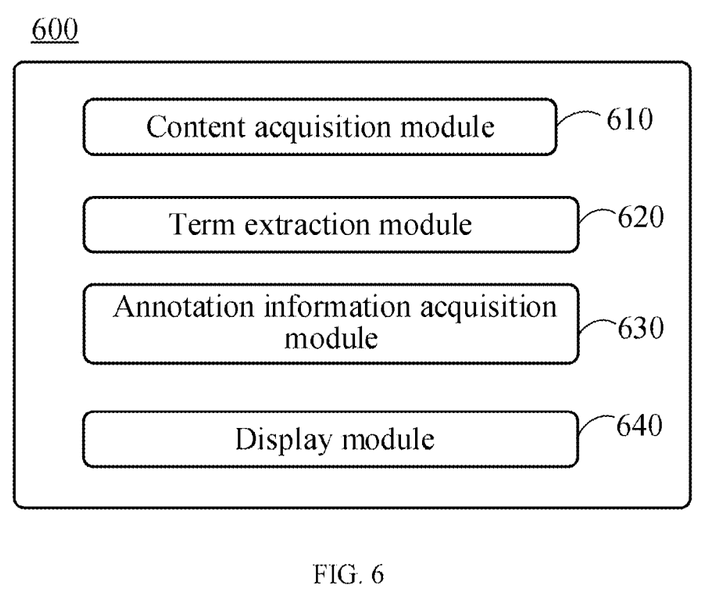
FIG. 6 shows a block diagram of a display apparatus according to exemplary embodiments of the present disclosure.

Exemplary embodiments of the present disclosure further provide a display apparatus. FIG. 6 shows a block diagram of a display apparatus according to exemplary embodiments of the present disclosure.

As shown in FIG. 6, a display apparatus 600 may include a content acquisition module 610, a term extraction module 620, an annotation information acquisition module 630, and a display module 640.

The content acquisition module 610 may be used to acquire a content to be displayed. The content to be displayed may include at least one selected from: a speech, a text, or an image. For example, the content acquisition module 610 may include a speech processing sub-module 611, which is used to: for the content to be displayed including a speech, process the speech to obtain a speech processing result. For example, the content acquisition module 610 may include an image recognition sub-module 612, which is used to: for the content to be displayed including an image, perform an optical character recognition on the image to obtain an image recognition result. For example, the content acquisition module 610 may include a text sub-module 613, which is used to: for the content to be displayed including a text, acquire and process the text included in the content.

The term extraction module 620 may be used to extract a target term from the content by using a term extraction rule. The term extraction rule may be based on at least one selected from: a trained tagging model, a word frequency analysis, a text style difference, or the like. The above-mentioned term extraction rules may be used alone or in any combination.

The annotation information acquisition module 630 may be used to acquire an annotation information for at least one target term, responsive to an extraction of the at least one target term. The annotation information acquisition module 630 may acquire the annotation information for the at least one target term, such as at least one selected from: an explanation and a description of the target term, a translation result corresponding to the target term, and/or other information, by querying a local database or accessing the Internet.

The display module 640 may be used to display the annotation information for the at least one target term and the content to be displayed. As described above, the display module 640 may display the annotation information for the term while displaying the content, and the term corresponding to the annotation information contained in the content may be displayed to have a visual effect different from that of other parts of the content, so as to emphasize the term. In an example, the display module 640 may be further used to: display the translation result of the content in a first region in a target language, and display the annotation information for the at least one target term in a second region in the target language. Alternatively, the display module 640 may be further used to: display the translation result of the content in the first region in the target language, and display the annotation information for the at least one target term in the second region in both a source language of the speech and the target language.

Exemplary embodiments of the present disclosure provide a display apparatus that may provide an intelligent natural language processing service with little or no human intervention, and may further provide a convenient term customization service for the user, which may help the user to enhance the understanding of the content.

Figure 7A:
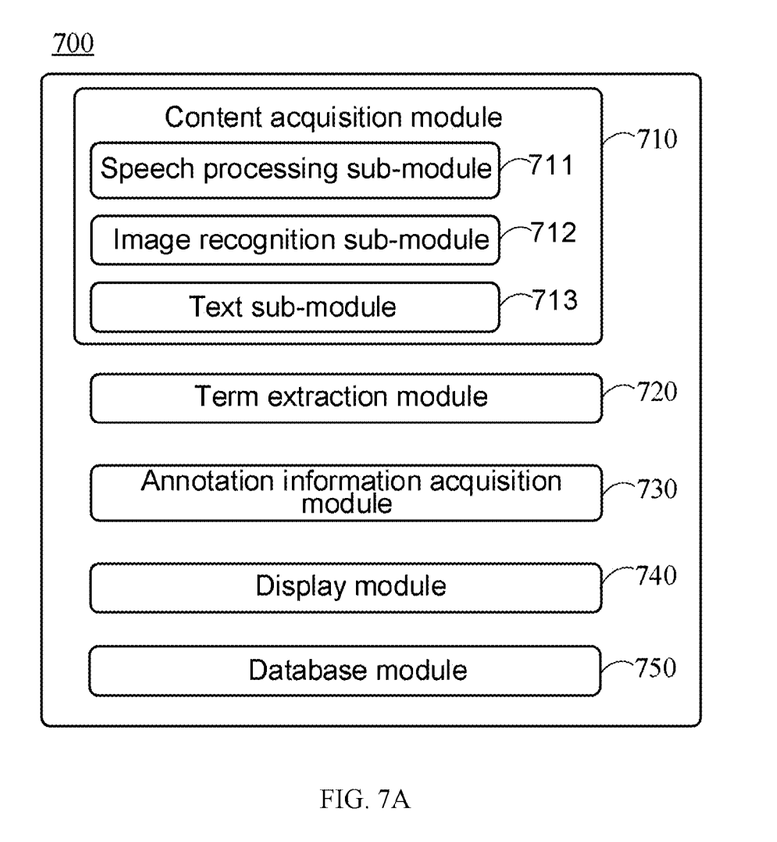
FIG. 7A shows a block diagram of a display apparatus according to exemplary embodiments of the present disclosure.

FIG. 7A shows a block diagram of a display apparatus according to exemplary embodiments of the present disclosure.

A display apparatus 700 shown in FIG. 7A, similar to the display apparatus 600 shown in FIG. 6, may include a content acquisition module 710, a term extraction module 720, an annotation information acquisition module 730, and a display module 740. Alternatively, the display apparatus 700 may further include a database module 750, so as to directly add a term database having a plurality of industry terms therein, and determine a plurality of industry terms as a plurality of candidate terms. The content acquisition module 710 includes a speech processing sub-module 711, an image recognition sub-module 712 and a text sub-module 713 which may receive an association content related to the content to be displayed, so as to predetermine the plurality of candidate terms and candidate term annotation information corresponding to the plurality of candidate terms. In this way, the efficiency of the term extraction and the accuracy of the annotation information for the term may be improved.

In an example, the text sub-module 713 may be used to receive an association text related to the content to be displayed. In this case, the term extraction module 720 may be further used to: determine a plurality of candidate terms from the association text by using the term extraction rule; and extract at least one candidate term among the plurality of candidate terms as the target term, responsive to a determination that the content to be displayed contains the at least one candidate term.

In an example, the image recognition sub-module 712 may be used to acquire an association image related to the content to be displayed, and recognize the association image to obtain an association image recognition result. In this case, the term extraction module 720 is further used to determine a plurality of candidate terms from the association image recognition result by using the term extraction rule; and extract at least one candidate term among the plurality of candidate terms as the target term, responsive to a determination that the content to be displayed contains the at least one candidate term.

In an example, the database module 750 may be used to add a database having a plurality of industry terms therein, and determine the plurality of industry terms as the plurality of candidate terms. The term extraction module 720 is further used to: extract at least one candidate term among the plurality of candidate terms as the target term, responsive to a determination that the content to be displayed contains the at least one candidate term.

Figure 7B:
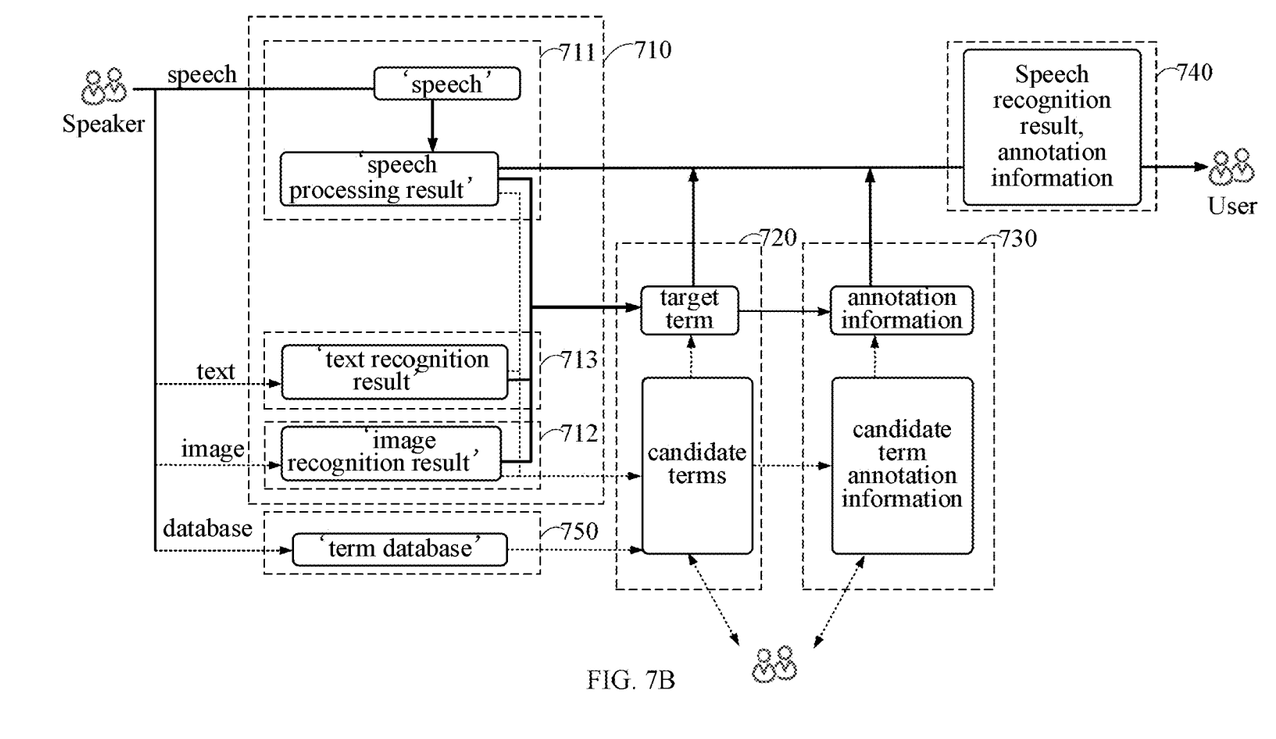
FIG. 7B shows a diagram illustrating a signal flow between various modules of the display apparatus shown in FIG. 7A.

FIG. 7B shows a signal flow between various modules of the display apparatus according to exemplary embodiments of the present disclosure. As shown in FIG. 7B, the content acquisition module 710 may acquire the content to be displayed. The content to be displayed is provided to the term extraction module 720 to recognize the target term from the content to be displayed by using the term extraction rule. Responsive to an extraction of at least one target term from the content to be displayed, the term extraction module 720 provides the target term to the annotation information acquisition module 730, and the annotation information acquisition module 730 acquires the annotation information for the target term.

The display module 740 may receive the content to be displayed from the content acquisition module 710, the target term from the term extraction module 720, and the annotation information from the annotation information acquisition module 730, so as to display the content to be displayed in the first region of the display picture and display the annotation information in the second region of the display picture. The target term contained in the content to be displayed may be displayed to have a display effect different from that of other parts, other than the target term, of the content. For example, the target term may be highlighted in the first region.

The display apparatus 700 may further predetermine the candidate terms and the candidate term annotation information, so as to further improve the efficiency of the term extraction and the accuracy of the annotation information.

In the example of determining the candidate terms and the candidate term annotation information, the display apparatus 700 may further include the database module 750. The text sub-module 713 may provide the association text related to the content to be displayed to the term extraction module 720 for a determination of the candidate terms. The image recognition sub-module 712 may receive the association image related to the content to be displayed and generate an association image recognition result through a recognition technology such as OCR, and provide the association image recognition result to the term extraction module 720 for a determination of the candidate terms. The database module 750 may directly receive a relevant term database and determine terms contained in the term database as the candidate terms. The term database may be a general term database or a specialized term database.

After the candidate terms are determined, the annotation information acquisition module 730 may acquire the candidate term annotation information.

As described above, by predetermining the plurality of candidate terms and the corresponding candidate term annotation information, the extraction of the target term may be accelerated, and the accuracy of the annotation information may be improved, which may help the user to enhance the understanding of the content.

As shown in FIG. 7B, after the candidate terms and the candidate term annotation information are determined, the determined plurality of candidate terms and/or corresponding candidate term annotation information may be reviewed by a reviewer/a review algorithm. In this way, the intervention on the term extraction and the term annotation may be achieved with a low human effort.

Therefore, the display apparatus provided according to exemplary embodiments of the present disclosure may not only provide an intelligent natural language processing service with little or no human intervention, but also provide a convenient term customization service for the user, which may help the user to enhance the understanding of the content. In addition, by predetermining the plurality of candidate terms and the corresponding candidate term annotation information, the extraction of the target term may be accelerated, and the accuracy of the annotation information may be improved, which may help the user to enhance the understanding of the content.

In the technical solution of the present disclosure, the collection, storage, use, processing, transmission, provision, disclosure and application of the annotation information and the term involved are all in compliance with the provisions of relevant laws and regulations, and necessary confidentiality measures have been taken, and it does not violate public order and good morals. In the technical solution of the present disclosure, before obtaining or collecting the user's personal information, the user's authorization or consent is obtained.

According to embodiments of the present disclosure, the present disclosure further provides an electronic device, a readable storage medium, and a computer program product.

Figure 8:
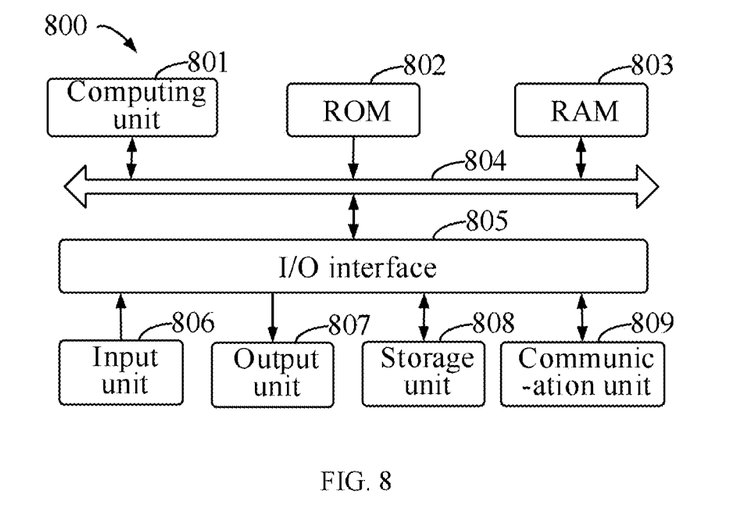
FIG. 8 shows a block diagram of an electronic device for implementing embodiments of the present disclosure.

FIG. 8 shows a schematic block diagram of an exemplary electronic device 800 for implementing embodiments of the present disclosure. The electronic device is intended to represent various forms of digital computers, such as a laptop computer, a desktop computer, a workstation, a personal digital assistant, a server, a blade server, a mainframe computer, and other suitable computers. The electronic device may further represent various forms of mobile devices, such as a personal digital assistant, a cellular phone, a smart phone, a wearable device, and other similar computing devices. The components as illustrated herein, and connections, relationships, and functions thereof are merely examples, and are not intended to limit the implementation of the present disclosure described and/or required herein.

As shown in FIG. 8, the electronic device 800 includes a computing unit 801 which may perform various appropriate actions and processes according to a computer program stored in a read only memory (ROM) 802 or a computer program loaded from a storage unit 808 into a random access memory (RAM) 803. In the RAM 803, various programs and data necessary for an operation of the electronic device 800 may also be stored. The computing unit 801, the ROM 802 and the RAM 803 are connected to each other through a bus 804. An input/output (I/O) interface 805 is also connected to the bus 804.

A plurality of components in the electronic device 800 are connected to the I/O interface 805, including: an input unit 806, such as a keyboard, or a mouse; an output unit 807, such as displays or speakers of various types; a storage unit 808, such as a disk, or an optical disc; and a communication unit 809, such as a network card, a modem, or a wireless communication transceiver. The communication unit 809 allows the electronic device 800 to exchange information/data with other devices through a computer network such as Internet and/or various telecommunication networks.

The computing unit 801 may be various general-purpose and/or dedicated processing assemblies having processing and computing capabilities. Some examples of the computing units 801 include, but are not limited to, a central processing unit (CPU), a graphics processing unit (GPU), various dedicated artificial intelligence (AI) computing chips, various computing units that run machine learning model algorithms, a digital signal processing processor (DSP), and any suitable processor, controller, microcontroller, etc. The computing unit 801 executes various methods and steps described above, such as the method and steps shown in FIG. 2 to FIG. 5B. For example, in some embodiments, the method and steps shown in FIG. 2 to FIG. 5B may be implemented as a computer software program which is tangibly embodied in a machine-readable medium, such as the storage unit 808. In some embodiments, the computer program may be partially or entirely loaded and/or installed in the electronic device 800 via the ROM 802 and/or the communication unit 809. The computer program, when loaded in the RAM 803 and executed by the computing unit 801, may execute one or more steps in the method described above. Alternatively, in other embodiments, the computing unit 801 may be configured to perform the method and steps described above by any other suitable means (e.g., by means of firmware).

Various embodiments of the systems and technologies described herein may be implemented in a digital electronic circuit system, an integrated circuit system, a field programmable gate array (FPGA), an application specific integrated circuit (ASIC), an application specific standard product (ASSP), a system on chip (SOC), a complex programmable logic device (CPLD), a computer hardware, firmware, software, and/or combinations thereof. These various embodiments may be implemented by one or more computer programs executable and/or interpretable on a programmable system including at least one programmable processor. The programmable processor may be a dedicated or general-purpose programmable processor, which may receive data and instructions from a storage system, at least one input device and at least one output device, and may transmit the data and instructions to the storage system, the at least one input device, and the at least one output device.

Program codes for implementing the methods of the present disclosure may be written in one programming language or any combination of more programming languages. These program codes may be provided to a processor or controller of a general-purpose computer, a dedicated computer or other programmable data processing apparatus, such that the program codes, when executed by the processor or controller, cause the functions/operations specified in the flowcharts and/or block diagrams to be implemented. The program codes may be executed entirely on a machine, partially on a machine, partially on a machine and partially on a remote machine as a stand-alone software package or entirely on a remote machine or server.

In the context of the present disclosure, a machine-readable medium may be a tangible medium that may contain or store a program for use by or in connection with an instruction execution system, an apparatus or a device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any suitable combination of the above. More specific examples of the machine-readable storage medium may include an electrical connection based on one or more wires, a portable computer disk, a hard disk, a random access memory (RAM), a read only memory (ROM), an erasable programmable read only memory (EPROM or a flash memory), an optical fiber, a compact disk read only memory (CD-ROM), an optical storage device, a magnetic storage device, or any suitable combination of the above.

In order to provide interaction with the user, the systems and technologies described here may be implemented on a computer including a display device (for example, a CRT (cathode ray tube) or LCD (liquid crystal display) monitor) for displaying information to the user, and a keyboard and a pointing device (for example, a mouse or a trackball) through which the user may provide the input to the computer. Other types of devices may also be used to provide interaction with the user. For example, a feedback provided to the user may be any form of sensory feedback (for example, visual feedback, auditory feedback, or tactile feedback), and the input from the user may be received in any form (including acoustic input, voice input or tactile input).

The systems and technologies described herein may be implemented in a computing system including back-end components (for example, a data server), or a computing system including middleware components (for example, an application server), or a computing system including front-end components (for example, a user computer having a graphical user interface or web browser through which the user may interact with the implementation of the system and technology described herein), or a computing system including any combination of such back-end components, middleware components or front-end components. The components of the system may be connected to each other by digital data communication (for example, a communication network) in any form or through any medium. Examples of the communication network include a local area network (LAN), a wide area network (WAN), and the Internet.

The computer system may include a client and a server. The client and the server are generally far away from each other and usually interact through a communication network. The relationship between the client and the server is generated through computer programs running on the corresponding computers and having a client-server relationship with each other. The server may be a cloud server or a server of distributed system or a server combined with block-chain.

It should be understood that steps of the processes illustrated above may be reordered, added or deleted in various manners. For example, the steps described in the present disclosure may be performed in parallel, sequentially, or in a different order, as long as a desired result of the technical solution of the present disclosure may be achieved. This is not limited in the present disclosure.

The above-mentioned specific embodiments do not constitute a limitation on the scope of protection of the present disclosure. Those skilled in the art should understand that various modifications, combinations, sub-combinations and substitutions may be made according to design requirements and other factors. Any modifications, equivalent replacements and improvements made within the spirit and principles of the present disclosure shall be contained in the scope of protection of the present disclosure.

What is claimed is:

1. A method for displaying a translation result of a speech in a conference, comprising:
   acquiring the translation result of translating the speech from a source language into a target language, and an association image related to the speech, wherein the association image is a screen picture of a speaker giving the speech in the conference;
   extracting at least one target term from the translation result using a term extraction rule;
   acquiring an annotation information for the at least one target term, responsive to an extraction of the at least one target term; and
   displaying the annotation information for the at least one target term and the translation result,
   wherein the extracting the at least one target term from the translation result using the term extraction rule comprises:
   performing an optical character recognition on a text information in the association image to obtain an association image recognition result, wherein the text information comprises a subtitle on the screen picture corresponding to the translation result; and
   extracting at least one candidate term among a plurality of candidate terms as the at least one target term, responsive to a determination that the association image recognition result contains the at least one candidate term, wherein the plurality of candidate terms and candidate term annotation information for the plurality of candidate terms are pre-determined based on a written speech of the speaker and/or a reference material of the speaker using the term extraction rule.

2. The method according to claim 1, wherein the extracting the at least one target term from the translation result using the term extraction rule further comprises:
   processing the speech to obtain a speech processing result; and
   extracting the at least one target term from the speech processing result using the term extraction rule.

3. The method according to claim 1, further comprising:
   adding a database having a plurality of industry terms therein.

4. The method according to claim 1, wherein the displaying the annotation information for the at least one target term and the translation result comprises:
   displaying the translation result in a first region and displaying the annotation information for the at least one target term in a second region,
   wherein, in the first region, a display visual effect of the at least one target term is different from a display visual effect of other parts of the translation result content.

5. The method according to claim 4, wherein the displaying the annotation information for the at least one target term in the second region comprises:
   displaying the annotation information for the at least one target term in the second region in the target language.

6. The method according to claim 4, wherein the displaying the annotation information for the at least one target term in the second region comprises:
   displaying the annotation information for the at least one target term in the second region in both the source language and the target language.

7. The method according to claim 1, wherein the term extraction rule is based on at least one selected from the group consisting of a trained tagging model, a word frequency analysis, and a text style difference.

8. An electronic device, comprising:
   at least one processor; and
   a memory communicatively connected to the at least one processor, wherein the memory stores instructions executable by the at least one processor, and the instructions, when executed by the at least one processor, cause the at least one processor to at least:
   acquire a translation result of translating a speech from a source language into a target language, and an association image related to the speech, wherein the association image is a screen picture of a speaker giving the speech in a conference;
   extract at least one target term from the translation result using a term extraction rule;
   acquire an annotation information for the at least one target term, responsive to an extraction of the at least one target term; and
   display the annotation information for the at least one target term and the translation result,
   wherein the instructions are further configured to cause the at least one processor to at least:
   perform an optical character recognition on a text information in the association image to obtain an association image recognition result, wherein the text information comprises a subtitle on the screen picture corresponding to the translation result; and
   extract at least one candidate term among a plurality of candidate terms as the at least one target term, responsive to a determination that the association image recognition result contains the at least one candidate term, wherein the plurality of candidate terms and candidate term annotation information for the plurality of candidate terms are pre-determined based on a written speech of the speaker and/or a reference material of the speaker using the term extraction rule.

9. The electronic device according to claim 8, wherein the instructions are further configured to cause the at least one processor to at least:
   process the speech to obtain a speech processing result; and
   extract the at least one target term from the speech processing result using the term extraction rule.

10. A non-transitory computer-readable storage medium having computer instructions therein, wherein the computer instructions are configured to cause a computer system to at least:
    acquire a translation result of translating a speech from a source language into a target language, and an association image related to the speech, wherein the association image is a screen picture of a speaker giving the speech in a conference;

extract at least one target term from the translation result using a term extraction rule;

acquire an annotation information for the at least one target term, responsive to an extraction of the at least one target term; and display the annotation information for the at least one target term and the translation result, wherein the computer instructions are further configured to cause the computer system to at least:

perform an optical character recognition on a text information in the association image to obtain an association image recognition result, wherein the text information comprises a subtitle on the screen picture corresponding to the translation result; and extract at least one candidate term among a plurality of candidate terms as the at least one target term, responsive to a determination that the association image recognition result contains the at least one candidate term, wherein the plurality of candidate terms and candidate term annotation information for the plurality of candidate terms are pre-determined based on a written speech of the speaker and/or a reference material of the speaker using the term extraction rule.

11. The non-transitory computer-readable storage medium according to claim 10, wherein the computer instructions are further configured to cause the computer system to at least:

process the speech to obtain a speech processing result; and extract the at least one target term from the speech processing result using the term extraction rule.

* * * * *